United States Patent Office 3,295,401
Patented Jan. 3, 1967

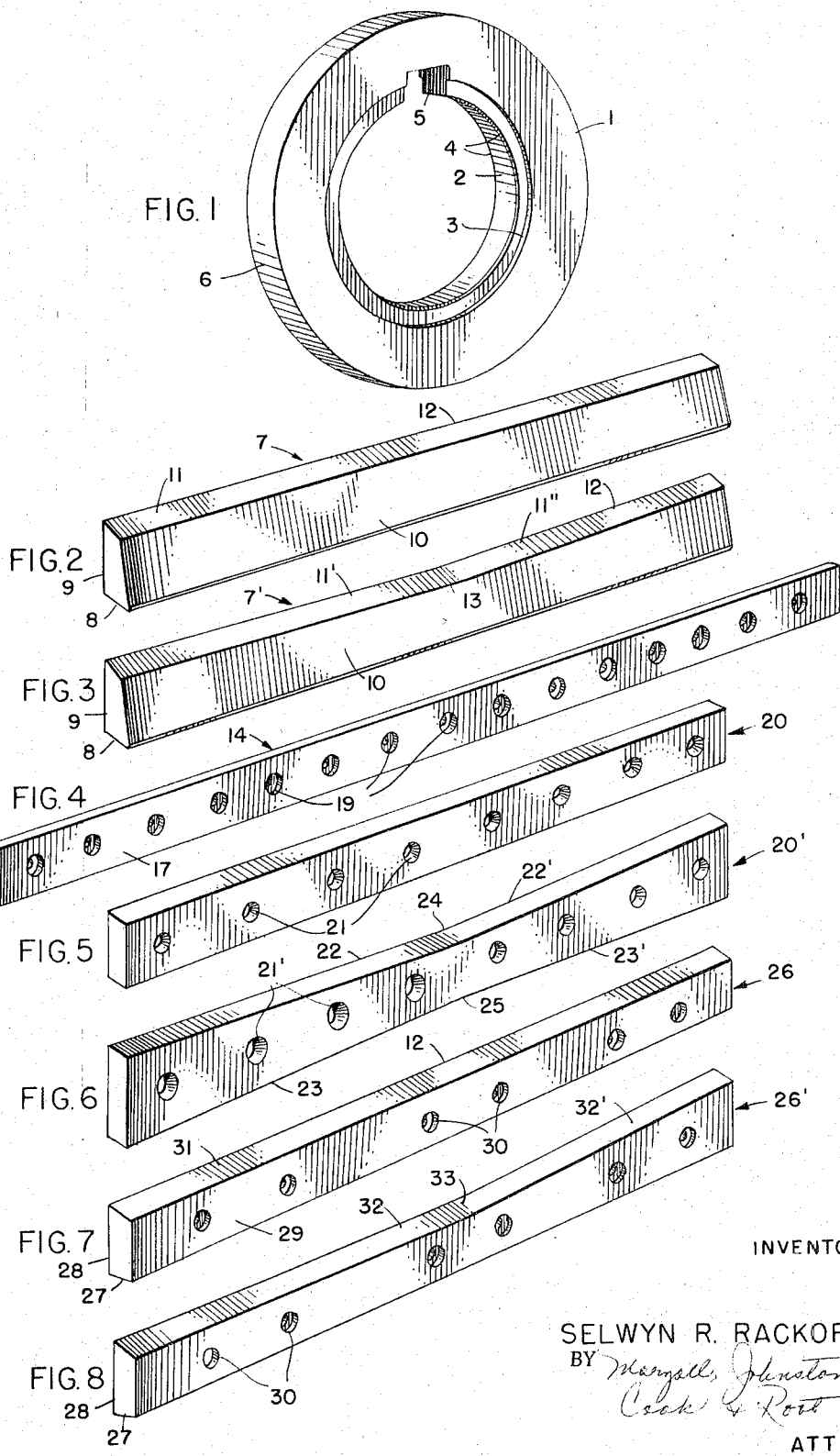

3,295,401
ALLOY STEEL SHEARING KNIVES
Selwyn R. Rackoff, Pittsburgh, Pa., assignor to American Shear Knife Company, Homestead, Pa., a corporation of Pennsylvania
Filed Dec. 19, 1963, Ser. No. 331,849
4 Claims. (Cl. 83—676)

This invention, in general, relates to improvements in alloy steel shearing knives or blades and, more particularly, pertains to shearing knives or blades of alloy steels which impart excellent abrasion resistance, which is reflected in longer working life of the knives or blades.

Shearing is the term applied to cutting in a line wherein two blades are forced against opposite sides of the material to be cut. The two opposing forces of the blades are greater than the yield point of the material. A well known form of shearing is that employed with the ordinary household shears or scissors.

In cutting metal, the same general principle of shearing is involved as is in the use of the ordinary household shears. Ordinarily, however, in mechanical metal shearing, one blade is on a movable head pulled down or pushed against the metal by a mechanical force and coacting in a shearing action with a fixed blade.

In one type of mechanical shearing apparatus, the blade mounted on the movable head or ram is inclined at an angle of 8–10° with the bottom or fixed blade, thereby touching and shearing a small amount of metal at any given instant. As the blade continues its movement, it gradually cuts or peels the metal until the full length of the particular cut is attained. The same principle of opposing, shearing forces is used in rotary shearing as in straight shearing, except that, instead of elongated blades or knives, round cutters are used. The stock being cut and/or the rotary cutters are guided so as to produce straight, round, or irregular shaped, cut blanks.

The many different types of shearing machines fall in four distinct classifications:

(a) Alligator (open or C-type frame shears),
(b) Guillotine (closed—housing or power square shears),
(c) Rotary straight line slitting shear, and
(d) Rotary or circular-cutting shears.

The accompanying drawing shows, for purposes of illustration, several types of shearing knives. The illustrated knives are by no means exhaustive of the structures of the generic class of shearing knives herein embraced. For further examples of shearing knife structures within said generic class, see Tool Engineers Handbook, published by McGraw-Hill Book Co. under the auspices of A.S.T.E. (First Ed., 1949), especially pages 850–853.

In the drawings:

FIG. 1 is a perspective view of an embodiment of a rotary shear blade or knife.

FIGS. 2 and 3 are perspective views of two embodiments of strip mill flying shear knives or blades.

FIG. 4 is a perspective view of an embodiment of a fly knife or blade used for paper cutting.

FIGS. 5 and 6 are perspective views of embodiments of shear blades or knives.

FIGS. 7 and 8 are perspective views of embodiments of flying shear blades or knives.

Blades or knives used to shear or slit metal are subject to great stresses, e.g., tensile stresses, and abrasion wear. In paper cutting, abrasion wear of the shearing edges is the primary concern. The improvements of this invention relate to employing as the steel alloy for such blades of knives an alloy of the composition wherein the percentages are by weight:

| | Percent |
|---|---|
| Carbon | 1.6–1.8 |
| Silicon | Up to 1 |
| Manganese | Up to 1 |
| Chromium | 11–14 |
| Vanadium | 1.5 to 2.8 |
| Molybdenum | Up to 1.5 |
| Tungsten | Up to 1.5 |

The remainder is substantially all iron along with very small amounts of normal steel-working residuals or impurities.

In addition to the foregoing, phosphorus in amounts up to 0.7% by weight and sulfur in amounts up to 0.7% by weight of the alloy composite may be included.

In the art of alloy steels for shearing blades or knives, it has been the practice to use carbon and vanadium in amounts substantially below the ranges above recited, i.e., in the order of a maximum of 1.5% carbon and 0.8% vanadium. A reason heretofore for using the lower carbon and vanadium contents is the expectancy that substantially higher amounts of carbon and vanadium would make the knife or blade bodies more brittle and hence more subject to failure under tensile stresses to which the blades are subjected in shearing or slitting metal or the like. We have found this not to be the case and have further found that alloy steels embodying the components in the ranges above described surprisingly impart to the shear blades or knives beneficial properties, especially substantial improvements in abrasive wear resistance without sacrifice of other properties such as hardness and tensile strength. The improvements in blade quality are further illustrated in the comparative test data reported hereafter.

In the most preferred form of the alloys used in the invention, the alloy ingredients, carbon, silicon, manganese, chromium, vanadium, and molybdenum and/or tungsten are present along with minor amounts of phosphorus and sulfur. These preferred alloys are composed of the following in percent by weight:

| | Percent |
|---|---|
| Carbon | 1.60–1.80 |
| Silicon | 0.30–0.50 |
| Manganese | 0.20–0.40 |
| Chromium | 11–14 |
| Vanadium | 1.5–2.2 |
| Molybdenum and/or Tungsten | 0.6–1.0 |
| Phosphorus | 0.01–0.03 |
| Sulfur | 0.01–0.03 |
| Remainder iron | |

Exemplary alloys used in the invention and their methods of manufacture are shown in the following illustrative examples.

*Example 1*

Two heats were prepared. These heats had the following analysis:

| Element | No. 1 | No. 2 |
|---|---|---|
| Carbon | 1.68 | 1.67 |
| Silicon | .35 | .36 |
| Manganese | .29 | .23 |
| Sulfur | .018 | .021 |
| Phosphorus | .016 | .014 |
| Chromium | 11.86 | 11.92 |
| Vanadium | 1.50 | 2.01 |
| Molybdenum | .80 | .79 |

The ingots of these heats forged well at 2075° F. into forgings approximately 2½" x 1⅜" x 12". Sixteen samples were cut from each heat. Four samples of each heat were austenitized for 40 minutes in a gas-fired semi-muffle furnace at each of the following temperatures: 1850° F., 1900° F., 1925° F., and 1950° F. Two samples of each group of four were oil quenched while the other two samples of each group were air cooled from the austenitizing temperatures. Rockwell C hardnesses were determined for each sample after removal of 0.30" from the surface. The Rockwell C hardnesses, reported as the average of five readings, were:

| Austenitizing Temperature, °F. | Hardness (Rockwell C) | | | |
| --- | --- | --- | --- | --- |
| | No. 1 | | No. 2 | |
| | Oil Quench | Air Cool | Oil Quench | Air Cool |
| 1,850 | 64.7 | 62.8 | 65.1 | 64.6 |
| 1,900 | 65.5 | 64.5 | 65.4 | 64.1 |
| 1,925 | 64.5 | 63.8 | 65.4 | 64.3 |
| 1,950 | 64.9 | 64.0 | 64.3 | 64.7 |

These hardnesses compared favorably with the hardnesses of similarly austenitized and quenched samples of a standard mill heat of Ohio Die 28989, which had the composition: carbon, 1.52%; silicon, 0.37%; manganese, 0.30%; chromium, 12.10%; vanadium, 0.79%; molybdenum, 0.84%; sulfur, 0.011%; phosphorus, 0.015%, and the remainder, substantially all iron. The substantially higher vanadium contents of Heat Nos. 1 and 2, therefore, did not alter significantly the as-quenched hardness in comparison against said standard mill heat with the lower vanadium and carbon content.

*Example 2*

A heat of the composition of Heat No. 2, supra, was heat treated in the form of a sample 5" square and 1½" thick in salt bath furnaces under the following conditions and gave the reported hardnesses:

Preheat—1125° F.
Quenching temperature—1900° F. Holding time at temperature 1 hour.
Quenching medium—Air cool to 100–150° F.
Temper—350° F. 4 hours.
Retemper—350° F. 4 hours.
Hardness as-quenched—Rockwell C 62.5.
Hardness after first tempering at 350° F.—Rockwell C 61.5.
Hardness after second tempering at 350° F.—Rockwell C 60.8.
After second tempering, sample retempered to 400° F. for 4 hours—Hardness Rockwell C 60.3.
Following this tempering, another retempering was done at 925° F. for 4 hours—Hardness Rockwell C 59.8.

*Example 3*

Circular slitter knives were made from an alloy of the invention of the approximate composition in percent by weight:

| | Percent |
| --- | --- |
| Carbon | 1.70 |
| Silicon | 0.35 |
| Manganese | 0.25 |
| Chromium | 12.00 |
| Vanadium | 2.00 |
| Molybdenum | 0.80 |
| Phosphorus | 0.015 |
| Sulfur | 0.20 |

Remainder iron.

Other circular slitter knives were made from a conventional high carbon-high chrome cold work die steel, analysis (AISI D2) of the following nominal composition:

| | Percent |
| --- | --- |
| Carbon | 1.55 |
| Silicon | 0.35 |
| Manganese | 0.25 |
| Chromium | 12.00 |
| Vanadium | 0.80 |
| Molybdenum | 0.80 |

Remainder iron.

The above slitter knives were employed on a rotary slitter in slitting high carbon, hot rolled steel. The average total footage of the hot rolled steel slit by the knives of the high carbon-high chrome cold work die steel was approximately 2,500,000; average number of grindings of the cutters was 25; and, therefore, there was an average of about 100,000 feet per grind.

The knives of the invention, on the other hand, had an average total footage of about 4,781,000 feet, an average of 35 grinds, and, therefore, an average of about 136,617 feet per grind. This represents increases of 91% in total footage, 40% in total grinds before necessary replacement of the rotary slitters, and 37% in average feet per grind.

*Example 4*

An alloy heat of the composition:

COMPOSITION A

| | Percent |
| --- | --- |
| Carbon | 1.69 |
| Silicon | 0.35 |
| Manganese | 0.27 |
| Sulfur | 0.030 |
| Phosphorus | 0.011 |
| Chromium | 11.86 |
| Vanadium | 2.10 |
| Molybdenum | 0.82 |

Remainder iron was formed into ⅞" square bar stock.

Four samples ⅞" square and ¼" thick were austenitized for thirty minutes in a gas-fired, semimuffled type furnace at each of the following temperatures: 1800, 1850, 1900, 1950 and 2000° F. All samples were air cooled to room temperature with two samples of each group of four being immediately refrigerated in Dry Ice and alcohol at −100° F. for four hours.

All samples were surface ground at 0.015" stock removal. As-quenched hardnesses were determined for both air cooled and refrigerated samples. Fracture grain size readings were obtained from the duplicate air cooled sample.

Based on hardness and grain size data, the austenitizing temperature of 1900° F. was chosen as being the best austenitizing temperature for the alloy heat. Similar sized samples of said heat were austenitized at said temperature for thirty minutes in the same furnace and air cooled. One sample each was double tempered (2+2 hours) at each of the following temperatures: 300, 350, 400, 450, 500, 600, 700, 800, 850, 900, 950, 1000, 1050, and 1100° F. All samples were surface ground at 0.015" stock removal, and Rockwell C hardness were determined following each temper.

The results of the foregoing tests are tabulated as follows:

TABLE 1.—ROCKWELL C, AS-QUENCHED HARDNESSES AND FRACTURE GRAIN SIZES (APPROX.) OF AIR COOLED SAMPLES

| Austenitizing Temp., °F. | Rockwell C (Average of 5) | Fracture Grain Size |
| --- | --- | --- |
| 1,800 | 57.5 | 8.4 |
| 1,850 | 60.5 | 8.5 |
| 1,900 | 63.0 | 8.4 |
| 1,950 | 64.5 | 8.1 |
| 2,000 | 64.5 | 8.0 |

TABLE 2.—ROCKWELL C AS-QUENCHED HARDNESSES (APPROX.) OF REFRIGERATED SAMPLES

| Austenitizing Temp., °F. | Rockwell C (Avg. of 5) |
|---|---|
| 1,800 | 58.5 |
| 1,850 | 62.0 |
| 1,900 | 64.5 |
| 1,950 | 65.5 |
| 2,000 | 66.0 |

TABLE 3.—ROCKWELL C HARDNESSES (APPROX.) OF DOUBLE TEMPERED (2+2 HOURS) OF 1900° F. AUSTENITIZED AND AIR COOLED SAMPLES

| Tempering Temp., °F. | First Temper (Avg. of 5) | Second Temper (Avg. of 5) |
|---|---|---|
| As-quenched | 63.0 |  |
| 300 | 62.6 | 62.8 |
| 350 | 62.0 | 62.2 |
| 400 | 61.0 | 61.0 |
| 450 | 60.6 | 60.6 |
| 500 | 59.8 | 60.2 |
| 600 | 59.2 | 60.0 |
| 700 | 59.5 | 60.1 |
| 800 | 59.6 | 60.2 |
| 850 | 59.8 | 60.3 |
| 900 | 60.5 | 60.5 |
| 950 | 59.7 | 60.0 |
| 1,000 | 58.0 | 57.0 |
| 1,050 | 54.0 | 52.6 |
| 1,100 | 49.2 | 47.0 |

Hardness dropped off sharply at tempers above 950° F., indicating a tempering temperature upper limit of about 950° F.

In samples of the alloy steel of Composition A, austenitized at 1800, 1850, 1900, 1950 and 2000° F. for thirty minutes, air cooled and double tempered at 400° F. (2+2 hours), Rockwell C hardnesses after each temper increased substantially in a substantially straight graph line for the lowest through the highest austenitizing temperatures from about 58.0 Rockwell C to about 62.0 Rockwell C.

In similarly austenitized samples the alloy steel of Composition A, which were air cooled to room temperature, refrigerated at −100° F. for four hours, and double tempered at 300° F. (2+2 hours), second temper Rockwell C hardnesses increased in a substantially straight graph line from the lowest through the highest austenitizing temperature from about 59.8 to 66.0. In the first tempered samples, Rockwell C hardnesses were about 0.5–1.0 higher at austenitizing temperatures of 1850, 1900 and 1950° F.

In austenitized samples of the alloy steel of Composition A, which were austenitized at respective temperatures of 1800, 1850, 1900, 1950 and 2000° F., air cooled to room temperature, refrigerated for 4 hours at −100° F., and double tempered at 450° F. (2+2 hours) both first and second temper Rockwell C hardnesses increased in a substantially straight graph line from a value of about 57.5 Rockwell C for the 1800° F. austenitized samples to about 62.5–63.0 Rockwell C for the 2000° F. austenitized samples.

The shearing blades or knives shown in the drawings exemplify types used in rotary shearing and straight shearing. The embodiment of FIG. 1 is a rotary shear blade or knife composed of an alloy steel heretofore described. It comprises a ring-shaped body 1 having a central aperture 2 to receive the drive shaft or spindle for supporting the shearing blade or knife. Both faces of the body 1 have an annular recess 3 adjacent the aperture 2. The edges 4 of the aperture 2 are chamfered, and the ring body 1 has a key slot 5 adapted to receive the key or spline on the rotary drive shaft or spindle. The work-contacting, radially outer edge 6 of the ring body 1 is cylindrical. This edge may have other shapes, e.g., V-shape, a frusto-cone, or any other shape suitable for the particular application. See, for example, page 853 of Tool Engineer's Handbook, supra.

The shearing blades or knives of the embodiments of FIGS. 2 and 3 are knives of the character used as strip mill, flying shear knives or blades. The knife or blade of FIG. 2 is a straight blade, while the knife or blade of FIG. 3 is a bow-tie blade. These knives or blades comprise a metal body 7 or 7′ forged from an alloy of the invention in a shape providing a planar wall 8, a planar wall 9 transverse thereto and a planar wall 10 sloping toward wall 9 in a direction from the wall 8. The work-contacting wall 11 is a planar wall forming an acute angle between it and the wall 9. This forms a somewhat acute, shearing edge 12 on the blades 7 and 7′.

The bow-tie knife or blade of FIG. 3 differs from the straight knife or blade of FIG. 2 in that the work-contacting wall is V-shaped. It is composed of wall portions 11′, 11″ which meet at a shallowly arcuate, center portion 13.

The knife or blade 14 of FIG. 4 is structurally typical of the fly knife for a paper cutting apparatus or machine and is also made of an alloy of the invention. This straight knife or blade is forged into a body having a planar wall 15, parallel, planar walls 16, 17 at right angles to the wall 15 and a rounded work-contacting wall 18. The blade 14 has a plurality of transverse holes 19 adapted to accommodate screws or bolts to attach the blade to a frame portion of the paper cutting apparatus or machine.

The knives or blades 20, 20′ of FIGS. 5 and 6 are structurally typical of straight and bow-tie shear knives. The knife body of FIG. 5 is a rectangular, parallelepipedon body made of an alloy of the invention. Any one of the four longitudinal corners of the blade may constitute the shearing edge. The blade body has a plurality of transverse holes 21 for a purpose similar to the holes 19.

The bow-tie shear knife of FIG. 6 differs from FIG. 5 in that the work-contacting walls on opposite sides of the blade or knife are V-shaped walls composed of segments 22 and 22′ and 23 and 23′ converging at a shallowly rounded, center portion 24 or 25, respectively. The blade has a plurality of transversely extending apertures 21′ similar to the apertures 21.

The knife or blade embodiments of FIGS. 7 and 8 are also made of the alloy steels of the invention and are structurally typical of straight and bow-tie flying shear knives. The straight knife 26 is forged into a knife body having a planar wall 27, planar, parallel walls 28, 29 and a planar, work-contacting wall 31 at an acute angle with wall 27. This knife has a shearing corner or edge 12 similar to the embodiments of FIGS. 2 and 3. The knife body has a plurality of transversely extending holes used for the same purposes as the holes previously described.

The bow-tie flying shear knife 26′ is similar to the knife of FIG. 7, except that the work-contacting wall is a V-shaped wall composed of sections 32, 32′ converging at a shallowly rounded center portion 33.

The foregoing description of the illustrated embodiments is intended only as being exemplary of types of shear blades or knives which can be manufactured from the alloys herein disclosed. The invention, however, embraces other shearing knife or blade structures other than those illustrated and described.

The invention is hereby claimed as follows:

1. A shearing blade comprising an alloy steel blade body having a shearing edge, said alloy steel consisting essentially of the following components in stated percents by weight: carbon, 1.6–1.8%; silicon, up to 1%; manganese, up to 1%; chromium, 11–14%; vanadium, 1.5–2.8%; molybdenum, up to 1.5%; tungsten, up to 1.5%; phosphorus, up to 0.7%; sulfur, up to 0.7%, and the balance being essentially all iron.

2. A rotary shearing blade for a rotary shear device comprising a disc-shaped, alloy steel, rotary blade body having an axial, centrally disposed aperture therein adapted to receive a shaft of a rotary shear device and having a circular shearing edge, said alloy steel consisting essentially of the following components in stated percents by weight: carbon, 1.6–1.8%; silicon, up to 1%; manganese, up to 1%; chromium, 11–14%; vanadium, 1.5–2.8%; molybdenum, up to 1.5%; tungsten, up to 1.5%; phosphorus, up to 0.7%; sulfur, up to 0.7%, and the balance being essentially all iron.

3. A shearing blade adapted for straight shearing on a shear device comprising an elongated, alloy steel, blade body having an elongated shearing edge, said alloy steel consisting essentially of the following components in stated percents by weight: carbon, 1.6–1.8%; silicon, up to 1%; manganese, up to 1%; chromium, 11–14%; vanadium, 1.5–2.8%; molybdenum, up to 1.5%; tungsten, up to 1.5%; phosphorus, up to 0.7%; sulfur, up to 0.7%, and the balance being essentially all iron.

4. An alloy steel shearing blade body as claimed in claim 1 wherein said alloy steel consists essentially of the following components in the stated percentages by weight: carbon, 1.60–1.80%; silicon, 0.30–0.50%; manganese, 0.20–0.40%; chromium, 11–14%; vanadium, 1.5–2.2%; a member selected from the group consisting of molybdenum and tungsten and mixtures thereof, 0.6–1.0%; phosphorus, 0.01–0.30%; sulfur, 0.01–0.03%; and the balance being essentially all iron.

References Cited by the Examiner
UNITED STATES PATENTS

| | | | |
|---|---|---|---|
| 4,280 | 5/1845 | Bogardus | 83—502 |
| 2,147,121 | 2/1939 | Emmons | 75—126 |
| 2,575,218 | 11/1951 | Giles | 75—126 |
| 2,709,132 | 5/1955 | Giles | 75—126 |
| 2,739,647 | 3/1956 | Coste | 83—500 |
| 3,144,326 | 8/1964 | Eglr | 75—126 |
| 3,167,423 | 1/1965 | Johnson | 75—126 |

DAVID L. RECK, *Primary Examiner.*

P. WEINSTEIN, *Assistant Examiner.*

UNITED STATES PATENT OFFICE
CERTIFICATE OF CORRECTION

January 3, 1967

Patent No. 3,295,401

Selwyn R. Rackoff

It is hereby certified that error appears in the above numbered patent requiring correction and that the said Letters Patent should read as corrected below.

Column 8, line 3, for "0.01-0.30%" read -- 0.01-0.03%

Signed and sealed this 7th day of November 1967.

(SEAL)
Attest:

Edward M. Fletcher, Jr.
Attesting Officer

EDWARD J. BRENNER
Commissioner of Patents